（12) United States Patent
Thepot et al.

(10) Patent No.: US 6,271,339 B1
(45) Date of Patent: Aug. 7, 2001

(54) PREPOLYMERS HAVING MALEIMIDE FUNCTIONS THE PROCESS FOR PREPARING THEM AND THEIR USES

(75) Inventors: Phillippe Thepot, Liancourt; Henri Strub, Pont Sainte Maxence, both of (FR)

(73) Assignee: Sartomer Company, Inc., Exton, PA (US)

( * ) Notice: Subject to any disclaimer, the term of this patent is extended or adjusted under 35 U.S.C. 154(b) by 0 days.

(21) Appl. No.: 08/927,604

(22) Filed: Sep. 12, 1997

Related U.S. Application Data

(60) Provisional application No. 60/029,294, filed on Oct. 21, 1996.

(30) Foreign Application Priority Data

Sep. 12, 1996 (FR) .................................................. 96 11133

(51) Int. Cl.⁷ ............................. C08G 69/08; C08G 73/10

(52) U.S. Cl. .................... 528/310; 528/312; 528/322; 528/331; 528/332; 528/335; 528/336; 528/339; 528/392

(58) Field of Search ..................................... 528/310, 312, 528/332, 322, 335, 336, 339, 392, 331

(56) References Cited

U.S. PATENT DOCUMENTS

| 3,652,716 | 3/1972 | Holub et al. ........................ 525/132 |
| 3,742,089 | 6/1973 | Schroeter ........................... 526/258 |
| 4,079,041 | 3/1978 | Baumann et al. ................... 526/258 |
| 4,383,903 | 5/1983 | Ayano et al. ........................ 522/11 |
| 4,663,424 | 5/1987 | Stix et al. .......................... 528/182 |
| 5,446,073 | 8/1995 | Jonsson et al. ..................... 522/106 |

FOREIGN PATENT DOCUMENTS

| 35 07 609 | 9/1985 | (DE) . |
| 40 28 845 | 3/1991 | (DE) . |
| 0 077 840 | 5/1981 | (EP) . |
| 0305882 | 3/1989 | (EP) . |
| 0309649 | 4/1989 | (EP) . |
| 0311735 | 4/1989 | (EP) . |
| 2 430 962 | 3/1980 | (FR) . |
| 2 476 102 | 8/1991 | (FR) . |
| WO 92/17526 | 10/1992 | (WO) . |

Primary Examiner—P. Hampton-Hightower
(74) Attorney, Agent, or Firm—Michael B. Fein; Cozen and O'Connor

(57) ABSTRACT

These prepolymers having maleimide functions (f) consist in the reaction products of at least one maleic anhydride represented by formula (I); of at least one compound (II) having at least one $-NH_2$ function and at least another function F selected from the group consisting of $-OH$, $-NH_2$, $-NH-$, $-COOH$, $-COOR^3$ or $-OOCR^3$; of at least one compound (III) capable of forming the chain of the prepolymers by polycondensation and/or polyaddition, said compound(s) (II) having first reacted with said maleic anhydride(s) (I) in order to open the maleic anhydride rings with formation of maleamic acid functions (f'), said maleamic acid functions having then been at least partially closed again under the action of heat into maleimides N-substituted by groups functionalized by a function F, the chain of said prepolymers having been formed by polycondensation and/or polyaddition of the N-substituted maleimide formed bearing the function F; of compound(s) (III) of uncyclized products bearing or not a function F formed simultaneously with said N-substituted maleimides of maleic anhydride(s) (I) which could have remained in excess after their opening by compound(s) (II);

the functionalities and proportions of compounds (II) and (III) having been selected in order to exclude any gelation of the reaction medium.

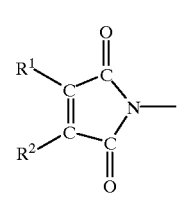

(f)

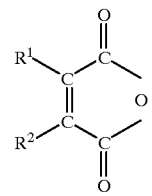

(I)

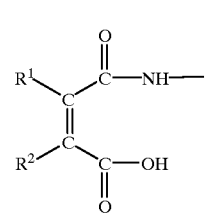

(f')

$R^1$, $R^2$=H, $C_1$–$C_{12}$ alkyl or halogen, $R^3$=$C_1$–$C_5$ alkyl.

36 Claims, No Drawings

PREPOLYMERS HAVING MALEIMIDE FUNCTIONS THE PROCESS FOR PREPARING THEM AND THEIR USES

This application claims benefit of Provisional appl. 60/029,294, filed Oct. 21, 1996.

The present invention relates to new prepolymers having maleimide functions, to a process for preparing them, and to their uses as constituents of polymerizable and/or crosslinkable compositions.

A large number of thermocurable compositions comprising monofunctional or polyfunctional maleimide monomers are known, said maleimides being sought for as a rule because they provide the thermocured compositions with a good thermal resistance.

It is desirable to provide compounds bearing maleimide functions, and, especially, aliphatic maleimides, in order to formulate radiation curable compositions, involving both compounds comprising electron depleted double bonds and compounds comprising electron enriched double bonds, said compounds bearing maleimide functions acting as compounds comprising electron depleted double bonds.

However, the synthesis of maleimides remains very difficult, which renders these compounds very expensive, and, consequently, which renders also very expensive the compositions of which they make part. This is particularly true in the case of the aliphatic maleimides, for which the yields of synthesis which are obtained are very poor.

In general, maleimides are prepared by opening the maleic anhydride by an amine, forming an amic acid, on which a ring forming reaction results in a maleimide. In general this ring forming is carried out in the presence of acetic anhydride possibly with a catalyst such as a tertiary amine and/or a metal salt. When the ring forming reaction is complete, the maleimide is precipitated by adding water to the medium and the maleimide is recovered by filtration. The excess of water causes the reaction by-products to precipitate, together with the maleimide, which requires one or several supplemental recrystallisation steps in order to obtain a pure compound. Furthermore, this process leads to the formation of large amounts of effluents (acetic acid). These processes are therefore expensive and difficult to carry out on an industrial scale.

Maleimides can also be prepared by reaction of maleic anhydride with an isocyanate. This process, which requires purification steps, is also expensive and difficult to carry out on an industrial scale.

It may be also pointed out that maleimides which are in general available on the market (generally aromatic ones) are hardly soluble, which prevents their using in a number of applications.

Besides, the maleimides introduced as monomers may induce migration problems if they are not completely polymerized in the polymerized compositions.

In order to mitigate the very important disadvantages of maleimide monomers, namely their high cost (due to the complexity of the preparation process and to the low yield) and to their insoluble character, various attempts have been described in the literature.

For instance, polymers (polyesters, polyamides, polyimides) terminated by maleimide groups have been described. In order to prepare these polymers, functionalized maleimide monomers are used, which are very often aromatic maleimides, because they are the ones which may be synthetized with acceptable yields and, consequently, with a comparatively lesser cost. The resulting polymers have the disadvantages of being in practice restricted to those ended by aromatic maleimides, and of requiring a process of preparation comprising several steps, because it is necessary to synthetize beforehand the maleimide which will have to be isolated; consequently, this process is expensive and it is very difficult to carry it into effect on an industrial scale.

We have now found that prepolymers, which comprise a sufficient amount of maleimide functions and which can therefore be directly used in the abovementioned applications, can be obtained by a process which involves no purification step, in which all the reagents introduced make part of the structure of the final prepolymers and in which only operations which are very easy to carry out on an industrial scale are involved (among others, requiring neither operations of crystallisation, filtration, and so on, nor discarding effluents), namely breaking away from all the difficulties of the prior art and offering moreover the advantage of not being restricted to maleimides N-substituted by aromatic groups introduced in these prepolymers. Furthermore the process results in maleimides of a polymeric nature which have the advantage of presenting a low capability of migration in the polymerized composition.

The subject of the present invention is thus prepolymers having maleimide functions (f):

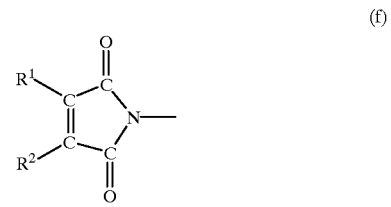

wherein each of $R^1$ and $R^2$ represents independently H, a $C_1$–$C_{12}$ alkyl group or a halogen,
said prepolymers consisting in the reaction products:
of at least one maleic anhydride represented by formula I:

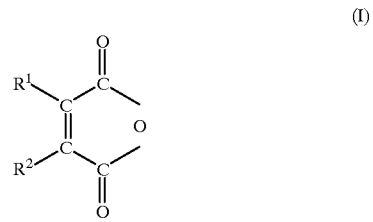

wherein $R^1$ and $R^2$ are such as defined above;
of at least one compound (II) having at least one —$NH_2$ function and at least another function F selected from the group consisting of —OH, —$NH_2$, —NH—, —COOH,

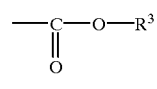

or 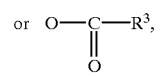

$R^3$ representing a $C_1$–$C_5$ alkyl group;
of at least one compound (III) capable of forming the chain of the prepolymers by polycondensation and/or polyaddition, said compound(s) (II) having first reacted with said maleic anhydride(s) (I) in order to open the maleic anhydride rings with formation of maleamic acid functions (f'):

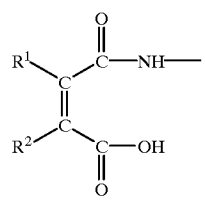
(f')

said maleamic acid functions having then been at least partially closed again under the action of heat into maleimides N-substituted by groups functionalized by a function F, the chain of said prepolymers having been formed by polycondensation and/or polyaddition:
- of the N-substituted maleimide formed bearing the function F;
- of compound(s) (III);
- of uncyclized products bearing or not a function F formed simultaneously with said N-substituted maleimides;
- of maleic anhydride(s) (I) which could have remained in excess after their opening by compound(s) (II);

the functionalities of compound(s) (III) being selected in order to allow the constitution of the chain with the grafting of said N-substituted maleimides on the chain directly by their function F when the latter is at least one selected among —OH, —NH$_2$, —NH— and —COOH, or after transesterification of the functions F when the latter are —COOR$^3$ or —OCOR$^3$ in order to allow the condensation or the addition of said N-substituted maleimide on the chain,
the functionalities and proportions of compounds (II) and (III) having been selected in order to exclude any gelation of the reaction medium.

In the prepolymer according to the invention, in general the compound(s) (II) has (have) reacted with anhydride(s) (I) under stoechiometric or substantially stoechiometric conditions or in excess of anhydride(s) (I) with respect to compound(s) (II).

Preferably, the anhydride of formula (I) is maleic anhydride.

The compounds (II) are especially selected among the compounds represented by the formulae H$_2$N-A-OH, H$_2$N-A-COOH, H$_2$N-A-COOR$^3$,

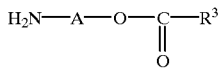

and H$_2$N-A-NH$_2$, wherein A represents a straight, branched or cyclic alkylene group, or an arylene group, it being possible for said groups to be interrupted by oxygen or sulfur atoms, or by —NR$^4$— groups, wherein R$^4$ represents hydrogen or alkyl.

As examples of these compounds (II),
aminoalcohols, such as ethanolamine, propanolamine, isopropanolamine, 2-(2-aminoethoxy)ethanol, N-(2-aminoethyl)ethanolamine;
aminoacids, such as valine, p-amino-benzoic acid, alanine, 2-aminohexanoic acid, 6-aminohexanoic acid, 7-aminoheptanoic acid, 2-aminoisobutyric acid;
the methyl or ethyl esters of the abovementioned aminoacids;
the esters of carboxylic acids having 2 to 5 carbon atoms, such as acetic acid, with the abovementioned aminoalcohols;
diamines, such as ethylenediamine, 2-methyl-1,5-pentamethylenediamine, hexamethylenediamine, 2,2,4- and/or 2,4,4-trimethylhexamethylenediamine, dodecamethylenediamine, 5-methylnonamethylenediamine, decamethylenediamine, isophoronediamine, bis(4-aminocyclohexyl)methane, bis(3-methyl-4-aminocyclohexyl)methane, bis(3-methyl-4-amino-5-ethylcyclohexyl)methane, 1,2-bis(4-aminocyclohexyl)ethane, 2,2'-bis(4-aminocyclohexyl)propane, 2,2'-bis(3-methyl-4-aminocyclohexyl)propane, 4,7-dioxadecane-1,10-diamine, 4,9-dioxadodecane-1,12-diamine, 4,7,10-trioxatridecane-1,13-diamine; and
polyoxyethylenated and/or polyoxypropylenated di- or triamines sold under the tradename "Jeffamine®", can be cited.

Trifunctional compounds (II) such as L-serine, 3-hydroxy 4-amino benzoic acid and 3-amino 4-hydroxy benzoic acid and other triamines such as N-(2-aminoethyl)-1,2-ethanediamine and N-(3-aminopropyl)-1,3-propanediamine, can also be cited.

When the N-substituted maleimide has a function F which is —OH, —NH$_2$ or —NH—, the compounds (III) are especially
- at least one polyacid and/or at least one cyclic anhydride; and
- at least one compound selected among a polyol, a mono- or polyfunctional epoxy, a polyamine and a polyisocyanate; or
- at least one polyisocyanate; and
- possibly at least one compound selected among a polyol, a mono- or polyfunctional epoxy, a polyacid and/or a cyclic anhydride and a polyamine.

When the N-substituted maleimide has a function F which is —COOH, the compounds (III) are especially:
- at least one compound selected among a polyol, a mono- or polyfunctional epoxy or a polyamine; and
- possibly a polyacid and/or a cyclic anhydride or a polyisocyanate; or
- at least one polyisocyanate; and
- possibly at least one compound selected among a polyol, a mono- or polyfunctional epoxy, a polyacid and/or a cyclic anhydride and a polyamine.

When the N-substituted maleimide has a function F which is

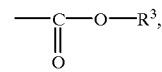

the compounds (III) are especially:
at least one compound allowing the transesterification, having a function —OH and at least one another function selected among —OH, —NH— and —COOH; and
in the case where this other function is —OH or —NH—, the compounds (III) as defined above in the case where the N-substituted maleimide has a function F which is —OH, —NH$_2$ or —NH—; and
in the case where this other function is —COOH, the compounds (III) as defined above in the case where the N-substituted maleimide has a function F which is —COOH.

When the N-substituted maleimide has a function F which is

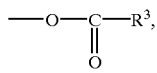

the compounds (III) are especially:
- at least one compound allowing the transesterification, having an acid function and at least another function selected among —OH, —NH— and —COOH; and
- in the case where this other function is —OH or —NH—, the compounds (III) as defined above in the case where the N-substituted maleimide has a function F which is —OH, —NH$_2$ or —NH—; and
- in the case where this other function is —COOH, the compounds (III) as defined above in the case where the N-substituted maleimide has a function F which is —COOH.

The polyols as compounds (III) which are used are preferably diols or triols, it being however possible for polyols of higher functionality (pentaerythritol for example) to be present in small amounts. As examples of diols or triols, propylene glycol, dipropylene glycol, diethylene glycol, ethylene glycol, 1,3-butanediol, 1,4-butanediol, neopentyl glycol, triethylene glycol, tripropylene glycol, butylene glycol, glycerol, trimethylol propane, 1,6-hexanediol, 1,4-cyclohexane diol, 1,4-cyclohexane dimethanol, 2-methyl-1,3-propane diol, 2-butyl-2-ethyl-1,3-propane diol, 1,2-bis(hydroxyethyl)cyclohexane, 4'-(2-hydroxyethoxy)-2,2-dimethyl-2-hydroxyacetophenone, 2,2-dimethyl-3-hydroxypropyl-2,2-dimethyl-3-hydroxypropionate and dibromoneopentylglycol, as well as polyether polyols, polyester polyols, polyurethane polyols having a weight average molecular weight which may be in particular between 200 and 1000 can be mentioned. Monoalcohols may be added in small amounts.

The epoxy compounds as compounds (III) are generally mono- and diepoxy compounds, among which epichlorhydrine, 7-oxa-bicyclo[4.1.0]heptane, 3,4-epoxycyclohexylmethyl 3,4-epoxycyclohexane carboxylate, bisphenol A diglycidyl ether, 1,2-epoxyhexadecane, 3,3,3-trichloropropylene oxide and allyl glycidyl ether can be mentioned.

The polyisocyanates as compounds (III) are, above all, diisocyanates, such as 4,4'-diphenylmethane diisocyanate, trimethylhexamethylene diisocyanate, toluene diisocyanate, isophoronediisocyanate, tetramethylene diisocyanate, pentamethylene diisocyanate, 4,4'-dicyclohexylmethane diisocyanate, 2,2,4-trimethylhexamethylene-1,6-diisocyanate, triphenylmethane-4,4',4"-triisocyanate, polymethylene polyphenylisocyanate, m-phenylene diisocyanate, p-phenylene diisocyanate, 1,5-naphtalene diisocyanate, naphtalene-1,4-diisocyanate, diphenylene-4,4'-diisocyanate, 3,3'-bi-tolylene-4,4'-diisocyanate, 1,4-cyclohexylene dimethylene diisocyanate, xylylene-1,4-diisocyanate, xylylene-1,3-diisocyanate, cyclohexyl-1,4-diisocyanate and 3,3'-dimethyldiphenylmethane-4,4'-diisocyanate, as well as prepolymers of the polyurea or polyurethane type, having isocyanate ends, and being as a rule of low molecular weight, such as the condensates of polyols and/or polyamines with an excess of polyisocyanate; and the polyisocyanates which contain, in their molecule, an isocyanurate ring and the biurets having isocyanate end functions.

As examples of polyisocyanates which contain, in their molecule, the isocyanurate ring, the trimers of hexamethylene diisocyanate sold by the Company RHÔNE-POULENC under the denomination TOLONATE HDT, the tris [1-(isocyanatomethyl)-1,3,3-trimethylcyclohexane] isocyanurate sold by the Company HULS under the denomination VESTANAT T 1890/100, can be cited.

As examples of biurets, the biuret of the diisocyanato-1,6-hexane sold under the denomination DESMODUR N100 by the Company BAYER, can be cited.

As main examples of polyacids as compounds (III), diacids, such as maleic, fumaric, chloromaleic, citraconic, metaconic, itaconic, tetraconic, orthophthalic, isophthalic, terephthalic, succinic, methylsuccinic, adipic, sebacic, tetrabromophthalic, tetrachlorophthalic, glutaric, pimelic, pyromellitic acids or the like, can be cited.

The cyclic anhydrides used as compounds (III), which are unsaturated or saturated, can be selected among maleic anhydride, succinic anhydride, phthalic anhydride, trimellitic anhydride, pyromellitic anhydride, tetrahydrophthalic anhydride, hexahydrophthalic anhydride, chlorinated anhydrides such as chlorendic anhydride, tetrachlorophthalic anhydride and tetrabromophtalic anhydride, methyltetrahydrophthalic anhydride, nadic anhydride, methyl nadic anhydride, itaconic anhydride, citraconic anhydride, and glutaric anhydride. Maleic anhydride and succinic anhydride are particularly mentioned. An anhydride including a photoinitiator moiety, such as 3,3',4,4'-benzophenonetetracarboxylic dianhydride, may be used in some applications.

The polyamines as compounds (III) are preferably selected among diamines, such as ethylene diamine, 2-methyl-1,5-pentamethylene diamine, trimethylexane-1,6-diamine, hexamethylene diamine, 2,2,4- and/or 2,4,4-trimethylhexamethylenediamine, dodecamethylenediamine, trimethylhexamethylenediamine, 5-methylnonamethylenediamine, decamethylenediamine, isophoronediamine, bis (4-aminocyclohexyl)methane, bis (3-methyl-4-aminocyclohexyl)methane, bis(3-methyl-4-amino-5-ethylcyclohexyl)methane, 1,2-bis (4-aminocyclohexyl)ethane, 2',2'-bis (4-aminocyclohexyl) propane and 2,2'-bis(3-methyl-4-aminocyclohexyl)propane.

Examples of compounds (III) allowing the transesterification, having an OH function and at least another function selected among —OH, —NH— and —COOH, are 2-hydroxybenzene acetic acid, parahydroxy benzoic acid, metahydroxy benzoic acid, 2-hydroxy-3-methyl benzoic acid, 2-hydroxy 4-methyl benzoic acid, 2-hydroxy 5-methyl benzoic acid, 2-(butylamino)-ethanol, 2-(cyclohexylamino)ethanol, 2-(phenylamino)-ethanol, 3-hydroxypiperidine, 4-hydroxypiperidine, dipropylene glycol, tripropylene glycol, triethylene glycol, 1,6-hexanediol, 1,4-cyclohexanediol, 1,4-cyclohexanedimethanol, 2-butyl 2-ethyl, 1,3-propanediol and 1,2-bis (hydroxethyl) cyclohexane.

Examples of compounds (III) allowing the transesterification, having an acid function and at least another function selected among —OH, —NH— and —COOH are 2-hydroxybenzene acetic acid, parahydroxy benzoic acid, metahydroxybenzoic acid, 2-hydroxy 3-methyl benzoic acid, 2-hydroxy 4-methyl benzoic acid, 2-hydroxy 5-methyl benzoic acid, N-methyl glycine, 2-methylamino benzoic acid, orthophtalic acid, terephthalic acid, isophthalic acid, adipic acid, pimelic acid, sebacic acid, tetrabromophtalic acid and tetrachlorophtalic acid.

The number average molecular weight ($\overline{Mn}$) of the prepolymers according to the invention can be between 350 and 5000, especially between 500 and 3000 (as measured by GPC, polystyrene standard). Moreover, said prepolymers can include 0.02 to 5 moles of maleimide groups, especially 0.05 to 2 moles of maleimide groups, by kg of prepolymer.

Furthermore, after the formation of the prepolymers according to the present invention, the acid end functions of the latter may have been reacted with a monoepoxy compound in order to adjust the acid value of said prepolymers especially to an acid value lower than 5 mg KOH/g.

The present invention relates also to a process for preparing prepolymers as defined above, characterized by the fact that at least one compound (I), at least one compound (II) and at least one compound (III)—said compounds (I), (II) and (III) being as defined above—are reacted under such conditions which allow to compound(s) (II) to react first with maleic anhydride(s) (I) in order to open maleic anhydride rings, maleamic acid functions being formed by opening said maleic anhydride rings by the primary amine function of said compound(s) (II), then being closed again at least partially into maleimide rings, under the action of heat, the maleimides so formed reacting with said compound(s) (III) and the chain of said prepolymer being formed by polycondensation and/or polyaddition reactions involving said compound(s) (III) and/or, in case where it would remain an excess of maleic anhydride after opening of (I) by (II), said excess of maleic anhydride (I), the uncyclized products entering also into the composition of the chain, the functionalities and proportions of compounds (II) and (III) having been selected in order to exclude a gelation of the reaction medium.

According to a first embodiment of the process according to the present invention, in a first step, at least one maleic anhydride (I) is reacted with at least one compound (II) in a polar solvent medium under stoechiometric or substantially stoechiometric conditions in order to open the anhydride rings;

in a second step, after evaporating said polar solvent and possibly after addition to the reaction medium of at least one polyacid and/or one cyclic anhydride as compound (III), a ring forming reaction is conducted by heating the reaction medium obtained at the end of the first step, wherein said ring forming reaction results in at least partially closing the maleic anhydride rings which were opened in the previous step, in order to give a product of at least partially ring forming reaction which comprises maleimides N-substituted by groups functionalized by —OH or —COOH or —COOR³ or —OCOR³ or —NH₂ or —NH— according to the compound(s) (II) used, in case where the ring forming reaction has been conducted in the absence of any cyclic anhydride (III), or maleimides N-substituted by groups functionalized by —COOH or —COOR³ or —OCOR³ with formation of the diacid corresponding to said cyclic anhydride (III), possibly in mixture with the excess of anhydride (III) or (I) not reacted, in case where the ring forming reaction has been conducted in the presence of cyclic anhydride (III); and in a third step, said product of the at least partially ring forming reaction is entered into a polycondensation and/or polyaddition reaction with at least one compound (III) as defined above.

At the first step, the maleic anhydride rings are opened by at least a part of —NH₂, —NH— or OH functions of compound(s) (II), the opening by —NH₂ functions leading to maleamic acid functions:

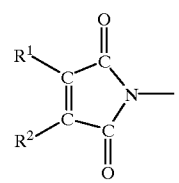

(f)

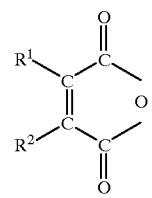

(I)

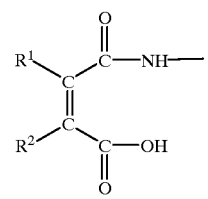

(f')

According to the type of compound (II) used, the opening of one or more maleic anhydride rings by said compound (II) may be obtained. The COOH or COOR³ or —OCOR³ functions of (II), possibly present; remain free.

This first step is generally conducted at a temperature of 0 to 80° C., especially of 0 to 20° C., during 1 to 10 hours, especially during 1 to 3 hours, in a polar solvent such as acetone, ethanol, chloroform, dichloromethane, tetrahydrofuran, cyclohexanone, dioxane, methylethylcetone and ethyl acetate.

Before starting the second step (at least partial cyclization), except if the same solvent is kept, the polar solvent of the first step is removed in general by evaporation. Otherwise, said solvent can be advantageous recycled. The cyclization is advantageously conducted in the presence of at least one cyclization catalyst, which is generally selected among metallic salts such as magnesium nitrate, chloride, bromide, sulphate and acetate, lithium nitrate, chloride, bromide and acetate, manganese (II) nitrate, chloride and acetate, cobalt (II) nitrate, chloride, bromide, sulphate and acetate, as well as zinc salts of maleamic acid.

In the case where the second step is conducted in the presence of cyclic anhydride [(III) and/or an excess of (I)], it is conducted generally at a temperature of 40 to 160° C., especially of 80 to 120° C., during 0.5 to 10 hours, especially during 1 to 6 hours, in an aprotic solvent such as toluene and xylene. One can also work in the absence of any solvent; the excess of anhydride could be considered as acting as a solvent.

In the case where the second step is conducted in the absence of anhydride, it is conducted generally at a temperature of 40 to 160° C., especially of 80 to 110° C., during 0.5 to 10 hours, especially during 3 to 7 hours, in a solvent of the amic acid as obtained in the first step. Ethanol and methanol can be mentioned.

The solvent used in this step is then generally evaporated and otherwise it can advantageously be recycled.

The polycondensation and/or polyaddition reactions of this third step are conventional reactions well known to the man skilled in the art.

In the case of a polycondensation with at least one polyol or one epoxy, and possibly with at least one polyacid or one anhydride, this step can conducted at a temperature of 150 to 250° C., possibly in the presence of at least one esterification catalyst such as, for example, tetrabutyl titanate, tetrabutyl zirconate, zirconium naphthenate, mixtures of tin oxalate and sodium acetate, stannous chloride, stannic chloride, dibutyltin oxide, tributyltin hydroxide, and butyl stannoic acid, and possibly in the presence of at least one radical polymerization inhibitor such as hydroquinone and its derivatives such as hydroquinone monomethyl ether, trimethylhydroquinone, quinone and its derivatives such as toluhydroquinone, tertiobutyl monohydroquinone, paratertiobutylcatechol, phenothiazine, N,N-dialkylhydroxyamines, nitrobenzene, ditertiobutylcatechol, p-phenolaniline, di-(2-ethylhexyl)-octylphenyl phosphite, 2,5-ditertiobutyl-4-hydroxytoluene, copper naphthenate, methylene blue and mixtures thereof. As a rule, the catalyst or the mixture of catalysts is used in an amount of about 0.01 to about 0.2% by weight of the reaction mixture, and the inhibitor or the mixture of inhibitors is used in an amount of about 0.01 to about 0.2% by weight of the reaction mixture. The beginning of the reaction is generally conducted at the atmospheric pressure, the end being possibly conducted under reduced pressure.

In the case of a reaction with a polyisocyanate, and, possibly, with at least one polyacid and/or one polyol and/or one epoxy, it being possible for an anhydride to be present if a polyol is also present, said third step can be conducted at a temperature of 20 to 200° C., it being possible for the addition reaction of the polyacid with the polyisocyanate to be carried out in the presence of a catalyst, such as triethylamine, benzyldimethylamine, 1,4-diazabicyclo[2.2.2]octane, potassium or sodium cyanide, it being possible for the reaction addition of the polyol with the polyisocyanate to be carried out in the presence of a catalyst such as triethylamine, cobalt naphtenate, stannous chloride, stannic chloride, tributyltin hydroxide, dibutyltin oxide, dibutyltin dilaurate, tetrabutyltin.

In case where the second step is conducted in the presence of anydride [(III) or excess of (I)], it is possible to add at the third step a polyisocyanate and/or a polyol, with possibly a polyacid (III); in case where the second step is conducted in the absence of anhydride, it is possible at the third step to add either a polyisocyanate alone, either a polyisocyanate and a polyol and/or a polyacid.

If there are esterification reactions (acid+alcohol) and addition reaction, esterification reactions are carried out first between 150 and 250° C., then the addition reactions (isocyanate+alcohol or acid) at temperatures lower than 150° C.

Otherwise, in a preliminary step, the double bond

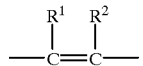

of the anhydride (I) is protected by a reaction with a protecting agent such as furan, furan derivatives, cyclopentadiene and cyclopentadiene derivatives, furan and cyclopentadiene being preferred, the deprotection being carried out at a time from the second step under the action of heat.

Consequently, the process according to this embodiment is a "one pot" process, which does not require to isolate the reaction products after each step, the only measure to be taken after the first and second steps being the evaporation of the solvent.

According to a second embodiment of the process according to the present invention, in a first step, at least one maleic anhydride (I) is reacted with at least one compound (II) in a polar solvent medium, at a temperature of 20–150° C., especially of 80–130° C., said compounds (I) being introduced in a stoechiometric excess with respect to compound(s) (II), in order to form a partially ring forming product having N-substituted maleimides functionalized by

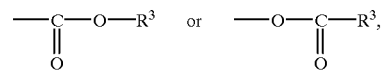

products of the opening of anhydride(s) (I), diacid corresponding to anhydrid (I) possibly in mixture with the excess of anhydride (I); and in a second step, said partially ring forming product is entered in a polycondensation and/or polyaddition reaction with at least one compound (III) such as defined above.

According to a third embodiment of the process according to the present invention, at least one compound (I), at least one compound (II) and at least one compound (III) selected among polyols, epoxy and polyamines, and possibly polyacids and cyclic anhydrides, are reacted in the absence of any solvent, in a stoechiometric excess of compound(s) (I) with respect to compound(s) (II), at a temperature of 180° C.–200° C. which is reached by steps or directly or gradually, with removing the possible condensation water, it being then possible to bring the mixture to a temperature lower 160° C., to add at least one polyisocyanate (III) and to conduct the alcohol/isocyanate reaction at that temperature.

According to a fourth embodiment of the process according to the present invention, at least one compound (I) and at least one compound (II) are reacted in a stoechiometric excess of compound(s) (I) with respect to compound(s) (II), in the absence of any solvent, at a temperature of 20–150° C., during 1 to 3 hours, then at least one compound (III) selected among polyols, epoxy and polyamines and possibly polyacids and cyclic anhydrides is added, and the reaction medium is brought to a temperature of 180° C.–200° C., which is reached by steps or directly or gradually, with removing the possible condensation water, it being then possible to bring the mixture to a temperature lower than 160° C., to add at least one polyisocyanate (III) and to conduct the alcohol/isocyanate reaction at that temperature.

According to a fifth embodiment of the process according to the present invention, at least one compound (I), at least one compound (II) and, as compounds (III), at least one polyisocyanate and at least one polyacid, and possibly at least one compound selected among polyols, epoxy and polyamines, are reacted in the absence of any solvent, in a stoechiometric excess of compound(s) (I) with respect to compound(s) (II), at a temperature lower than 160° C.

The processes according to these second to fifth embodiments are also of the "one-pot" type.

An additional step may be carried out in order to lower the acid value of some prepolymers, for instance to an acid value lower than 5 mg KOH/g by addition of a monoepoxy under conditions which are well known to the one skilled in the art, generally at a temperature of the order of 110 to 150° C., so that this monoepoxy can react with the residual carboxylic groups of the prepolymer.

The present invention relates also to polymerizable and/or crosslinkable compositions, including at least one prepolymer as defined above or prepared by the process as defined above. Such compositions are generally polymerizable and/or crosslinkable by free radical route, it being possible for radicals to be induced either by thermal route and/or by irradiation by ultraviolet or visible light or by irradiation by an electron beam.

So, the prepolymers according to the invention can also enter into thermocurable moulding compositions; such compositions, which can further include at least one co-polymerizable compound and the usual additives, such as fillers, fibers, anti-shrinkage additives, comprise at least one free radical initiator, such as a diazo compound, a peroxide, an hydroperoxide, and possibly, an accelerator of the peroxide decomposition.

The prepolymers according to the present invention can also enter into coating compositions which can be cured by ultraviolet or visible light or by an electron beam or by thermal route. Such compositions can also include at least one among a copolymerizable compound (such as styrene), a monomer or oligomer reactive diluent, a non reactive solvent or diluent, an usual additive such as a pigment.

In the UV polymerizable compositions, a photoinitiator can be present. As examples of photoinitiators, α-diketones, such as benzile and diacetyle;

acyloins, such as benzoin;

acyloin ethers, such as benzoin methyl ether, benzoin ethyl ether, benzoin isopropyl ether and benzoin isobutyl ether;

thioxanthones, such as thioxanthone, 2,4-diethylthioxanthone, thioxanthone-1-sulfonic acid, sulfonic isopropyl-thioxanthone-4,isopropylthioxanthone and 2-chlorothioxanthone;

benzophenones, such as benzophenone, 4,4'-bis(dimethylamino)benzophenone, 4,4'-bis(diethylamino) benzophenone, 4,4'-diethylaminobenzophenone, Mischler ketone;

propiophenones, such as 2-hydroxy-2-methylpropiophenone, 4'-isopropyl-2-hydroxy-2-methylpropiophenone;

acetophenones, such as acetophenone, p-dimethylaminoacetophenone, α,α'-dimethoxyacetoxyacetophenone, 2,2-dimethoxy-2-phenylacetophenone, p-methoxyacetophenone, 2-methyl-[4-(methylthio)phenyl]-2-morpholino-1-propanone, 2,2-diethoxyacetophenone, 4'-phenoxy-2,2-dichloroacetophenone, 2-benzyl-2-N,N-dimethylamino-1-(4-morpholinophenyl)-butanone-1, 2,2 -dimethoxy-2-phenyl-acetophenone, 2-hydroxy-2-methyl-1-phenylpropanone;

quinones, such as anthraquinone, 2-ethyl-anthraquinone, 2-chloroanthraquinone, 1,4-naphtoquinone;

alpha-hydroxyarylketones, such as 1-hydroxycyclohexyl phenyl ketone;

halogenated compounds, such as phenacyl chloride, tribromomethylphenylsulfone, tris(trichloromethyl)-s-triadine;

peroxides, such as di-t-butyl peroxide; and other compounds such as benzile dimethyl ketal; isoamyl N,N-dimethylaminobenzoate, ethyl N,N-dimethylaminobenzoate, benzoin benzoate, 2-hydroxy-2-methyl-1-phenyl propanone, α-acyloxime ester, can be cited.

These compounds can be used either individually as photoinitiator, either as a mixture of at least two of them as a photoinitiator system. Furthermore, at least one photoactivator can be associated with the photoinitiator or with the photoinitiator system.

The present invention relates also to the products obtained by polymerization and/or crosslinking of the compositions as defined above.

The formulations and the implementations of these thermocurable compositions and coating compositions are well known to the one skilled in the art.

The following examples illustrate the present invention without however limiting the scope thereof.

SYNTHESIS EXAMPLE 1

1 mole of isopropanolamine is slowly added to a solution cooled to 5° C. of maleic anhydride (1 mole) in acetone (200 ml). After having stirred the mixture for 2 h at room temperature, acetone is evaporated. Then 600 ml of toluene and 4 moles of maleic anhydride are added. The reaction mixture is refluxed (110° C.) for 4 h, then toluene is evaporated. To 30 g of the obtained mixture, 14.7 g of propyleneglycol, 200 ppm of hydroquinone and 15 ppm of copper naphthenate are added. The reaction medium is heated firstly at 160° C., then at 200° C., with removing the condensation water, the end of the reaction being conducted under reduced pressure. The reaction is stopped when an acid value of 60 mg KOH/g is reached. The number average molecular weight of the resulting prepolymer, determined by GPC (polystyrene standard), is 1875. The prepolymer contains 0.36 mole of maleimide functions by kg of resin.

SYNTHESIS EXAMPLE 2

15 g of isopropanolamine are slowly added to a solution cooled to 5° C. of maleic anhydride (19.6 g) in acetone (30 ml). After having stirred the mixture for 2 h at room temperature, acetone is evaporated. Then 100 ml of toluene, 78.4 g of maleic anhydride and 0.7 g of zinc chloride are added. To 60 g of the obtained mixture, 32.2 g of propylene glycol, 15 ppm of copper naphthenate and 200 ppm of hydroquinone are added. The reaction medium is heated at 180–200° C. with removing the condensation water, the end of the reaction being conducted under reduced pressure. The reaction is stopped when an acid value of 49 mg KOH/g is reached. The number average molecular weight of the resulting prepolymer, determined by GPC (polystyrene standard), is 1249. The prepolymer contains 0.54 mole of maleimide functions by kg of resin.

SYNTHESIS EXAMPLE 3

37.5 g of isopropanolamine are slowly added to a solution cooled to 5° C. of maleic anhydride (49 g) in acetone (75 ml). After having stirred the mixture for 2 h at room temperature, acetone is evaporated. Then 250 ml of toluene, 196 g of maleic anhydride and 8.2 g of sodium acetate are added. The reaction medium is refluxed for 4 h, then the toluene is evaporated. To 70 g of the obtained mixture, 32.3 g of propylene glycol, 15 ppm of copper naphthenate and 200 ppm of hydroquinone are added. The reaction medium is heated at 180–200° C. with removing the condensation water, the end of the reaction being conducted under reduced pressure. The reaction is stopped when an acid value of 49 mg KOH/g is reached. The number average molecular weight of the resulting prepolymer, determined by GPC (polystyrene standard), is 1382.

SYNTHESIS EXAMPLE 4

One mole of furan is slowly added to a solution at 5° C. of maleic anhydride (1 mole) in 200 ml of acetone, then is stirred for 12 h at room temperature. Then, acetone is added in order to entirely solubilize the addition product. 1 mole of isopropanolamine is slowly added to the solution cooled to 5° C. After having stirred the mixture for 2 h at room temperature, acetone is evaporated. Then 600 ml of toluene and 4 moles of maleic anhydride are added. The reaction medium is refluxed for 4 h, then the solvent is evaporated. To 30 g of the obtained mixture, 15.2 g of propylene glycol, 200 ppm of hydroquinone and 15 ppm of copper naphthenate are added. The reaction mixture is heated at first at 160° C., then at 200° C. with removing the condensation water, the end of the reaction being conducted under reduced pressure. The reaction is stopped when an acid value of 40 mg KOH/g is reached. The number average molecular weight of the resulting prepolymer, determined by GPC (polystyrene standard), is 1951.

SYNTHESIS EXAMPLE 5

The synthesis is conducted in the same way as in the Synthesis example 1 for the first two steps. To 110 g of the mixture obtained after evaporation of toluene, 84.6 g of diethylene glycol, 15 ppm of copper naphthenate and 200 ppm of hydroquinone are added. Then the reaction medium is heated to 180–200° C. with removing of the condensation water, the end of the reaction being conducted under reduced pressure. The reaction is stopped when an acid value of 38 mg KOH/g is reached. The number average molecular weight of the resulting prepolymer, determined by GPC (polystyrene standard), is 1362.

SYNTHESIS EXAMPLE 6

0.3 mole of ethanolamine are added to a solution of maleic anhydride (0.6 mole) in 170 ml of toluene. The solution is heated for 2 h at 80° C. Then, 300 ml of toluene and 0.9 mole of maleic anhydride are added. The reaction medium is refluxed for 4 h and the solvent is evaporated. 1 mole of propylene glycol, 200 ppm of hydroquinone and 15 ppm of copper naphthenate are added. The reaction medium is heated at 160° C., then at 200° C., with removing the condensation water, the end of the reaction being conducted under reduced pressure. The reaction is stopped when an acid value of 44 mg KOH/g is reached. The number average molecular weight of the resulting prepolymer, determined by GPC (polystyrene standard), is 1248.

SYNTHESIS EXAMPLE 7

1.4 mole of maleic anhydride is dissolved in 300 ml of chloroform at 60° C. The heating is stopped, the addition conducted dropwise of 2-methyl-1,5-pentamethylene diamine (0.7 mole) is started and the reaction medium is stirred for 3 h at room temperature after that the addition is finished. Then the solvent is evaporated. To 0.07 mole of the obtained reaction product, 0.21 mole of maleic anhydride, 50 ml of toluene are added, the reaction medium is refluxed for 4 h, then the solvent is evaporated. To 35 g of the obtained mixture, 15.4 g of propylene glycol, 200 ppm of hydroquinone and 15 ppm of copper naphthenate are added. The reaction medium is heated at 160° C., then at 200° C., with removing the condensation water, the end of the reaction being conducted under reduced pressure. The reaction is stopped when an acid value of 58 mg KOH/g is reached. The number average molecular weight of the resulting prepolymer, determined by GPC (polystyrene standard), is 1308. The prepolymer contains 1.20 mole of maleimide functions per kg of resin.

SYNTHESIS EXAMPLE 8

98 g of maleic anhydride dissolved in 50 ml of THF are slowly added to a solution at 60° C. of 117.1 g of valine in 150 ml of THF. After having stirred for 7 h at 60° C., the solvent is evaporated. To 20.3 g of the obtained mixture, 27.7 g of maleic anhydride, 150 ml of toluene are added, the reaction medium is refluxed for 4 h, then the solvent is evaporated. To 44.0 g of the obtained mixture, 25.6 g of propylene glycol, 15 ppm of copper naphthenate and 200 ppm of hydroquinone are added. The reaction medium is heated at 180–200° C. with removing the condensation water, the end of the reaction being conducted under reduced pressure. The reaction is stopped when an acid value of 36 mg KOH/g is reached. The number average molecular weight of the resulting prepolymer, determined by GPC (polystyrene standard), is 1438.

SYNTHESIS EXAMPLE 9

The synthesis is conducted in the same way as in Synthesis example 1 for the first two steps. To 300 g of the mixture obtained after evaporation of toluene, 75 g of propylene glycol, 104.7 g of diethylene glycol, 200 ppm of hydroquinone and 15 ppm of copper naphthenate are added. Then the reaction medium is heated at 180° C., then at 200° C., with removing the condensation water, the end of the reaction being conducted under reduced pressure. The reaction is stopped when an acid value of 45 mg KOH/g is reached. The number average molecular weight of the resulting prepolymer, determined by GPC (polystyrene standard), is 2689.

SYNTHESIS EXAMPLE 10

0.26 mole of isopropanolamine is slowly added to a solution cooled to 5° C. of maleic anhydride (0.26 mole) in acetone (50 ml). After having stirred the mixture for 2 h at room temperature, the acetone is evaporated. Then 150 ml of toluene and 1.04 mole of succinic anhydride are added. The reaction medium is refluxed for 4 h, then the toluene is evaporated. 0.82 mole of propylene glycol, 200 ppm of hydroquinone and 15 ppm of copper naphthenate are added. The reaction medium is heated at 160° C., then at 200° C. with removing the condensation water, the end of the reaction being conducted under reduced pressure. The reaction is stopped when an acid value of 60 mg KOH/g is reached. The number average molecular weight of the resulting prepolymer, determined by GPC (polystyrene standard), is 1166.

SYNTHESIS EXAMPLE 11

0.5 mole of isopropanolamine is slowly added to a solution cooled to 5° C. of maleic anhydride (0.5 mole) in 100 ml of acetone. After having stirred the mixture for 2 h at room temperature, the acetone is evaporated. Then 300 ml of ethanol are added, the reaction medium is refluxed for 4 h and ethanol is evaporated. To 66 g of the obtained product, 15.7 g of maleic anhydride, 12.8 g of propylene glycol, 15 ppm of copper naphthenate and 200 ppm of hydroquinone are added. The reaction medium is heated at 180–200° C. with removing the condensation water, the end of the reaction being conducted under reduced pressure. The reaction is stopped when an acid value of 40 mg KOH/g is reached. The number average molecular weight of the resulting prepolymer, determined by GPC (polystyrene standard), is 1451.

SYNTHESIS EXAMPLE 12

2.82 g of isopropanolamine are slowly added to 18.4 g of maleic anhydride at 65° C., then the reaction medium is heated at 100° C. for 2 h. Then 11 g of propylene glycol, 15 ppm of copper naphthenate and 200 ppm of hydroquinone are added, and the reaction medium is heated at 180–200° C. with removing the condensation water, the end of the reaction being conducted under reduced pressure. The reaction is stopped when an acid value of 48 mg KOH/g is reached. The number average molecular weight of the resulting prepolymer, determined by GPC (polystyrene standard), is 1857.

SYNTHESIS EXAMPLE 13

5.63 g of isopropanolamine are slowly added to 36.75 g of maleic anhydride at 65° C. The mixture is heated at 80° C. for 1 h, at 100° C. for 1 h, and at 120° C. for 2 h. Then, 20.8 g of propylene glycol, 15 ppm of copper naphthenate and 200 ppm of hydroquinone are added, and the reaction medium is heated at 180–200° C. with removing the condensation water, the end of the reaction being conducted under reduced pressure. The reaction is stopped when an acid value of 58 mg KOH/g is reached. The number average molecular weight of the resulting prepolymer, determined by GPC (polystyrene standard), is 1313. The prepolymer contains 0.49 mole of maleimide functions by kg of resin.

SYNTHESIS EXAMPLE 14

15 ppm of copper naphthenate, 200 ppm of hydroquinone, then slowly 3.75 g of isopropanolamine are added to 24.5 g of maleic anhydride at 65° C. The reaction medium is heated at 80° C. for 30 min., at 100° C. for 1 h, then at 120° C. for 1 h. Then, 30.7 g of 2-butyl-2-ethyl-1,3-propanediol are added, and the reaction medium is heated at 180–200° C. with removing the condensation water, the end of the reaction being conducted under reduced pressure. The reaction is stopped when an acid value of 38 mg KOH/g is reached. The number average molecular weight of the resulting prepolymer, determined by GPC (polystyrene standard), is 1555.

SYNTHESIS EXAMPLE 15

15 g of isopropanolamine are slowly added to 98 g of maleic anhydride at 60° C. When the addition is over, the mixture is heated at 120° C. for 2 h. 37 g of propyleneglycol, 15 ppm of copper naphthenate and 200 ppm of hydroquinone are added to 60.5 g of the mixture as obtained. The reaction medium is heated to 180° C. with removing the condensation water, the end of the reaction being conducted under reduced pressure. The reaction is stopped when an acid value of 12 mg KOH/g is reached. 1.36 g of phenyl glycidyl ether and 25 mg of benzyltriethylammonium chloride are added to 23.7 g of the polymer as obtained, brought at a temperature of 115° C. After a stirring conducted at 130° C. for 2 h, the prepolymer has an acid value of 1.5 mg KOH/g.

SYNTHESIS EXAMPLE 16

1.55 g of allyl glycidyl ether are added at 105° C. to 31.3 g of the prepolymer prepared in Synthesis example 15 (having an acid value of 12 mg KOH/g). The temperature is gradually raised from 105 to 140° C. over a duration of 2 h 45 min. The prepolymer as obtained has then an acid value of 2 mg KOH/g.

SYNTHESIS EXAMPLE 17

3.75 g of isopranolamine are added to a mixture at 60° C. of maleic anhydride (24.5 g) and propylene glycol (14.6 g) containing 15 ppm of copper naphthenate and 200 ppm of hydroquinone. Then, the reaction medium is heated at 160° C., then at 200° C. with removing the water condensation, the end of the reaction being conducted under reduced pressure. The reaction is stopped when an acid value of 45 mg KOH/g is reached. The number average molecular weight of the resulting prepolymer, determined by GPC (polystyrene standard), is 1319. The prepolymer contains 0.48 mole of malimide functions by kg of resin.

SYNTHESIS EXAMPLE 18

15 g of isopropanolamine are slowly to 98 g of maleic anhydride at 60° C. The reaction medium is heated at 80° C. for 30 min, at 100° C. for 30 min, then at 120° C. for 1 h. To 111 g of the obtained mixture, 108.3 g of propylene glycol, 15 ppm of copper naphthenate and 200 ppm of hydroquinone are added. The reaction medium is heated at 180–200° C. with removing the condensation water, the end of the reaction being conducted under reduced pressure. The reaction is stopped when an acid value of 24 mg KOH/g is reached. To 30 g of the obtained mixture, 3.5 g of trimethylhexamethylene diisocyanate are added, and the reaction medium is heated for 2 h at 70° C. The reaction is stopped when an hydroxyl value of 160 mg KOH/g is reached. The number average molecular weight of the resulting prepolymer, determined by GPC (polystyrene standard), is 1534.

SYNTHESIS EXAMPLE 19

4.58 g of ethanolamine are slowly added to 36.7 g of maleic anhydride at 60° C. When the addition is over, the mixture is heated at 120° C. for 2 h. Then 24.88 g of ethylene glycol, 200 ppm of hydroquinone and 100 ppm of a tin esterification catalyst are added. The reaction medium is heated to 180° C. with removing the condensation water, the end of the reaction being conducted under reduced pressure. The reaction is stopped when an acid number of 2 mg KOH/g is reached. To 100 g of the prepolymer as obtained, brought to a temperature of 140° C., 1.5 equivalent by residual carboxylic acid function of a monofunctional epoxy is added together with a catalyst of the epoxy/carboxylic acid reaction. After 0.5 h at 140° C., a prepolymer is obtained, which has an acid value lower than 0.5 mg KOH/g, and a number average molecular weight (determined by GPC, polystyrene standard), of 1100. The prepolymer contains 0.46 mole of maleimide functions by kg of resin.

SYNTHESIS EXAMPLE 20

1 mole of isopropanol amine is slowly added to a solution cooled to 5° C. of maleic anhydride (1 mole) in acetone (200 ml). After having stirred the mixture for 2 h at room temperature, acetone is evaporated. Then 600 ml of toluene and 4 moles of maleic anhydride are added. The reaction medium is refluxed for 4 h, then toluene is evaporated. To 25 g of the obtained mixture, 40.2 g of polyoxypropylene diamine, 20 ml of xylene, 300 ppm of hydroquinone are added, and the reaction medium is heated at 180° C. with removing the condensation water, the end of the reaction being conducted under reduced pressure. The reaction is stopped when an acid value of 69 mg KOH/g is reached. The number average molecular weight of the resulting prepolymer, determined by GPC (polystyrene standard), is of 1063.

In all the synthesis examples 1 to 20, the NMR $^{13}$C has allowed to confirm the presence of maleimide groups carried by the obtained prepolymers.

APPLICATION EXAMPLE 1

80 g of the product obtained in Synthesis example 6 are added to 20 g of styrene and 2 g of cumene hydroperoxide. The obtained mixture is applied onto a glass plate with a K hand coater bar, in order to obtain a film having a thickness of 12 μm. After treatment at 150° C. for 30 min, then at 200° C. for 3 h, a perfectly crosslinked film is obtained, which shows a pencil hardness of 3 H (hardness measured after 24 h at room temperature).

APPLICATION EXAMPLE 2

33 g of butanediol divinyl ether, 0.5 g of Darocure® 1173 and 0.5 of Irgacure® 184 are added to 67 g of the prepolymer obtained in Synthesis example 1. The obtained mixture is applied onto a glass plate with a K hand coater bar, in order to obtain a film having a thickness of 12 μm. The curing of the film is conducted by the ultraviolet light, the used lamp being a lamp F450 (H-bulb), having an output of 120 W/cm, put on the market by the company FUSION. A film having a pencil hardness of 4 H is obtained after 1 passage under the lamp at 54 m/min (hardness measured after 24 h at room temperature).

APPLICATION EXAMPLE 3

32.95 g of butanediol divinyl ether are added to 67.05 g of the prepolymer obtained in Synthesis example 1. The application and the crosslinking are conducted in the same way as in the Application example 2. A film having a pencil hardness of H is obtained after 1 passage under the lamp at 54 m/min. 4 passages at 35 m/min lead to a hardness of 3 H (the hardnesses have been measured after 24 h at room temperature).

What is claimed is:

1. Prepolymers having maleimide functions (f):

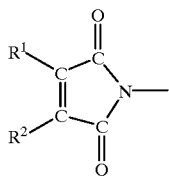

(f)

wherein each of $R^1$ and $R^2$ represents independently H, a $C_1$–$C_{12}$ alkyl group, or a halogen, said prepolymers being prepared by reacting at least one maleic anhydride represented by formula (I):

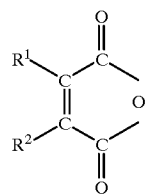

(I)

with at least one amino-functional compound (II) having at least one —$NH_2$ function and at least another function F selected from the group consisting of —OH, —$NH_2$, —NH—,

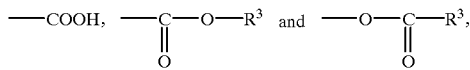

$R^3$ representing a $C_1$–$C_5$ alkyl group;
to form F functional compounds having groups of the formula (f'):

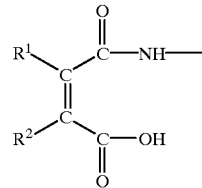

heating to partially form maleimides N-substituted by groups having a function F; and
reacting residual compounds having groups of the formula (f') and said maleimides N-substituted by groups having a function F with at least one polyfunctional compound III, said compound III having functional groups reactive with said function F, without gelation of the reaction medium.

2. Prepolymers according to claim 1 wherein the equivalents ratio of anhydride(s) to amino-functional compound(s) is at least 1:1.

3. Prepolymers according to claim 1 wherein the anhydride of the formula (I) is maleic anhydride.

4. Prepolymers according to claim 1 wherein the amino-functional compound (II) is selected from compounds represented by the formulae $H_2N$-A-OH, $H_2N$-A-COOH, $H_2N$-A-COOR$^3$,

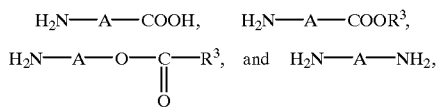

and $H_2N$-A-$NH_2$,
wherein A represents a straight, branched or cyclic alkylene group or arylene group, it being possible that oxygen or sulfur atoms, or —$NR^4$— groups, wherein $R^4$ represents hydrogen or alkyl, be included in the chain or cycle of A.

5. Prepolymers according to claim 4, wherein the compound (II) is selected from the group consisting of
aminoalcohols selected from the group consisting of ethanolamine, propanolamine, isopropanolamine, 2-(2-aminoethoxy)ethanol, N-(2-aminoethyl)ethanolamine;
aminoacids selected from the group consisting of valine, p-amino-benzoic acid, alanine, 2-aminohexanoic acid, 6-aminohexanoic acid, 7-aminoheptanoic acid, 2-aminoisobutyric acid;
the methyl or ethyl esters of said aminoacids;
the esters of carboxylic acids having 2 to 5 carbon atoms and said aminoalcohols;
diamines selected from the group consisting of ethylenediamine, 2-methyl-1,5-pentamethylenediamine, hexamethylenediamine, 2,2,4- and/or 2,4,4-trimethylhexamethylenediamine, dodecamethylenediamine, 5-methylnonamethylenediamine, decamethylenediamine, isophoronediamine, bis(4-aminocyclohexyl)methane, bis(3-methyl-4- aminocyclohexyl)methane, bis(3-methyl-4-amino-5-ethylcyclohexyl)methane, 1,2-bis(4-aminocyclohexyl)-ethane, 2,2'-bis(4-aminocyclohexyl) propane, 2,2'-bis(3-methyl-4-aminocyclohexyl) propane, 4,7-dioxadecane-1,10-diamine, 4,9-dioxadodecane-1,12-diamine, 4,7,10-trioxa-tridecane-1,13-diamine;

polyoxyethylenated and/or polyoxypropylenated di- or triamines; and trifunctional compounds selected from the group consisting of L-serine, 3-hydroxy 4-amino benzoic acid and 3-amino 4-hydroxy benzoic acid, and triamines selected from the group consisting of N-(2-aminoethyl)-1,2-ethanediamine and N-(3-aminopropyl)-1,3-propanediamine.

6. Prepolymers according to claim 1 wherein said N-substituted maleimide has a function F selected from —OH, —NH$_2$ and —NH—, and said polyfunctional compounds (III) comprise
   (a) at least one compound selected from polyacid and cyclic anhydride and at least one compound selected from polyol, mono- or polyfunctional epoxy, polyamine, polyisocyanate; or
   (b) at least one polyisocyanate; or
   (c) at least one polyisocyanate and at least one compound selected from polyol, mono- or polyfunctional epoxy, polyacid, cyclic anhydride, and polyamine.

7. Prepolymers according to claim 1 wherein the N-substituted maleimide has a function F which is —COOH, and the compounds (III) comprise:
   (a) at least one compound selected from polyol, mono- or polyfunctional epoxy, and polyamine; or
   (b) at least one compound selected from polyol, mono- or a polyfunctional epoxy and polyamine and at least one compound selected from polyacid, cyclic anhydride and polyisocyanate; or
   (c) of at least one polyisocyanate; or
   (d) at least one polyisocyanate and at least one compound selected from polyol, mono- or polyfunctional epoxy, polyacid, cyclic anhydride and polyamine.

8. Prepolymers according to claim 1, wherein the N-substituted maleimide has a function F which is

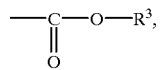

and the compounds (III) are:
   (A) at least one compound allowing the transesterification, having a function —OH and at least one another function selected among —OH, —NH— and —COOH; and
   (B) when said other function is —OH or —NH—,
      (a) at least one compound selected from polyacid and cyclic anhydride and at least one compound selected from polyol, mono- or polyfunctional epoxy, polyamine, and polyisocyanate; or
      (b) at least one polyisocyanate; or
      (c) at least one polyisocyanate and at least one compound selected from polyol, mono- or polyfunctional epoxy, polyacid, cyclic anhydride and polyamine; and
   when said another function is —COOH,
      (a) at least one compound selected from polyol, mono- or polyfunctional epoxy epoxy and polyamine; or
      (b) at least one compound selected from polyol, mono- or polyfunctional epoxy and polyamine and at least one compound selected from polyacid, cyclic anyhydride and polyisocyanate; or
      (c) at least one polyisocyanate; or
      (d) at least one polyisocyanate and at least one compound selected from polyol, mono- or polyfunctional epoxy, polyacid, cyclic anhydride and polyamine.

9. Prepolymers according to claim 1 wherein the N-substituted maleimide has a function F which is

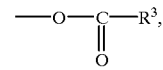

and the polyfunctional compounds (III) are:
   (A) at least one compound allowing the transesterification, having a function —OH and at least another function selected among —OH, —NH— and —COOH; and
   (B) when said another function is —OH or —NH,
      (a) at least one compound selected from polyacid and cyclic anhydride and at least one compound selected from polyol, mono- or polyfunctional epoxy, polyamine, and polyisocyanate; or
      (b) at least one polyisocyanate; or
      (c) at least one polyisocyanate and at least one compound selected from polyol, mono- or polyfunctional epoxy, polyacid, cyclic anhydride and polyamine; and
   when said another function is —COOH,
      (a) at least one compound selected from polyol, mono- or polyfunctional epoxy and polyamine; or
      (b) at least one compound selected from polyol, mono- or polyfunctional epoxy and polyamine and at least one compound selected from polyacid, cyclic anhydride and polyisocyanate; or
      (c) at least one polyisocyanate; or
      (d) at least one polyisocyanate and at least one compound selected from polyol, mono- or polyfunctional epoxy, polyacid, cyclic anhydride and polyamine.

10. Prepolymers according to claim 1 wherein said polyfunctional compounds (III) are selected from propylene glycol, dipropylene glycol, diethylene glycol, ethylene glycol, 1,3-butanediol, 1,4-butanediol, neopentyl glycol, triethylene glycol, tripropylene glycol, butylene glycol, glycerol, trimethylol propane, 1,6-hexanediol, 1,4-cyclohexane diol, 1,4-cyclohexane dimethanol, 2-methyl-1, 3-propane diol, 2-butyl-2-ethyl-1,3-propane diol, 1,2-bis(hydroxyethyl)cyclohexane, 4'-(2-hydroxyethoxy)-2,2-dimethyl-2-hydroxyacetophenone, 2,2-dimethyl-3-hydroxypropyl-2,2-dimethyl-3-hydroxypropionate and dibromoneopentylglycol, as well as polyether polyols, polyester polyols, and polyurethane polyols having a weight average molecular weight between 200 and 1000.

11. Prepolymers according to claim 1 wherein the polyfunctional compounds III are epoxy compounds selected from epichlorhydrine, 7-oxa-bicyclo[4.1.0]heptane, 3,4-epoxycyclohexylmethyl 3,4-epoxycyclohexane carboxylate, bisphenol A diglycidyl ether, 1,2-epoxyhexadecane, 3,3,3-trichloropropylene oxide, and allyl glycidyl ether.

12. Prepolymers according to claim 1 wherein the polyfunctional compounds III are polyisocyanates selected from 4,4'-diphenylmethane diisocyanate, trimethylhexamethylene diisocyanate, toluene diisocyanate, isophoronediisocyanate, tetramethylene diisocyanate, pentamethylene diisocyanate, 4,4'-dicyclohexylmethane diisocyanate, 2,2,4-trimethylhexamethylene-1,6-diisocyanate, triphenylmethane-4,4',4"-triisocyanate, polymethylene polyphenylisocyanate, m-phenylene diisocyanate, p-phenylene diisocyanate, 1,5-naphtalene diisocyanate, naphtalene-1,4-diisocyanate, diphenylene-4,4'-diisocyanate, 3,3'-bi-tolylene-4,4'-diisocyanate, 1,4-cyclohexylene dimethylene diisocyanate, xylylene-1,4-diisocyanate, xylylene-1,3-diisocyanate, cyclohexyl-1,4-diisocyanate and 3,3'-dimethyldiphenylmethane-4,4'-diisocyanate, prepolymers of the polyurea or polyurethane type, having isocyanate ends, and polyisocyanates which contain, in their molecule, an isocyanurate rings and the biurets having isocyanate end functions.

13. Prepolymers according to claim 1 wherein the polyfunctional compounds III are polyacids selected from maleic, fumaric, chloromaleic, citraconic, metaconic, itaconic, tetraconic, orthophthalic, isophthalic, terephthalic, succinic, methylsuccinic, adipic, sebacic, tetrabromophthalic, tetrachlorophthalic, glutaric, pimelic, and pyromellitic acids.

14. Prepolymers according to claim 1 wherein the polyfunctional compounds III are cyclic anhydrides selected from maleic anhydride, succinic anhydride, phthalic anhydride, trimellitic anhydride, pyromellitic anhydride, tetrahydrophthalic anhydride, hexahydrophthalic anhydride, chlorinated anhydrides such as chlorendic anhydride, tetrachlorophthalic anhydride and tetrabromophthalic anhydride, methyltetrahydrophthalic anhydride, nadic anhydride, methyl nadic anhydride, itaconic anhydride, citraconic anhydride, and glutaric anhydride.

15. Prepolymers according to claim 1 wherein the polyfunctional compounds III are polyamines selected from ethylene diamine, 2-methyl-1,5-pentamethylene diamine, trimethylhexane-1,6-diamine, hexamethylene diamine, 2,2,4- and/or 2,4,4-trimethylhexamethylenediamine, dodecamethylenediamine, trimethylhexamethylenediamine, 5-methyl-nonamethylene-diamine, decamethylenediamine, isophoronediamine, bis(4-aminocyclohexyl)methane, bis(3-methyl-4-aminocyclohexyl)methane, bis (3-methyl-4-amino-5-ethylcyclohexyl)methane, 1,2-bis(4-aminocyclohexyl)ethane, 2',2'-bis(4-aminocyclo-hexyl) propane, and 2,2'-bis(3-methyl-4-aminocyclo-hexyl) propane.

16. Prepolymers according to claim 1 wherein the polyfunctional compound III are selected from 2-hydroxybenzene acetic acid, parahydroxy benzoic acid, metahydroxy benzoic acid, 2-hydroxy-3-methyl benzoic acid, 2-hydroxy 4-methyl benzoic acid, 2-hydroxy 5-methyl benzoic acid, 2-(butylamino)-ethanol, 2-(cyclohexylamino) ethanol, 2-(phenylamino)ethanol, 3-hydroxypiperidine, 4-hydroxypiperidine, dipropylene glycol, tripropylene glycol, triethylene glycol, 1,6-hexanediol, 1,4-cyclohexanediol, 1,4-cyclohexanedimethanol, 2-butyl 2-ethyl, 1,3-propanediol, and 1,2-bis (hydroxethyl) cyclohexane.

17. Prepolymers according to claim 1 wherein the polyfunctional compounds III are selected from 2-hydroxybenzene acetic acid, parahydroxy benzoic acid, metahydroxybenzoic acid, 2 -hydroxy 3-methyl benzoic acid, 2-hydroxy 4-methyl benzoic acid, 2-hydroxy 5-methyl benzoic acid, N-methyl glycine, 2-methylamino benzoic acid, orthophtalic acid, terephthalic acid, isophthalic acid, adipic acid, pimelic acid, sebacic acid, tetrabromophtalic acids and tetrachlorophtalic acid.

18. Prepolymers according to claim 1 having a number average molecular weight between 350 and 5000.

19. Prepolymers according to claim 1 having 0.02 to 5 moles of maleimide groups by kg of prepolymer.

20. Prepolymers according to claim 1 wherein after their formation, their acid end functions are reacted with a monoepoxy compound in order to adjust their acid value to a value lower than 5 mg KOH/g.

21. A process for preparing prepolymers according to claim 1, wherein at least one compound (I), at least one compound (II) and at least one compound (III) are reacted under such conditions which allow compound(s) (II) to react first with compound(s) (I) in order to open maleic anhydride rings, maleamic acid functions being formed by opening said maleic anhydride rings by the primary amine function of said compound(s) (II), then being closed again partially into maleimide rings, under the action of heat, the maleimides so formed reacting with said compound(s) (III) and the chain of said prepolymer being formed by polycondensation and/or polyaddition reactions involving said compound(s) (III) and/or, in case where an excess of maleic anhydride remains after opening of (I) by (II), said excess of maleic anhydride (I), the uncyclized products entering also into the composition of the chain, the functionalities and proportions of compounds (II) and (III) having been selected in order to exclude a gelation of the reaction medium.

22. The process according to claim 21, wherein:
   in a first step, at least one maleic anhydride (I) is reacted with at least one compound (II) in a polar solvent medium under stoichiometric or substantially stoichiometric conditions in order to open the anhydride rings;
   in a second step, after evaporating said polar solvent and optionally after addition to the reaction medium of at least one polyacid and/or one cyclic anhydride as compound (III), a ring forming reaction is conducted by heating the reaction medium obtained at the end of the first step, wherein said ring forming reaction results in partially closing the anhydride rings which were opened in the previous step, in order to give a product of partially ring forming reaction which comprises maleimides N-substituted by groups functionalized by —OH or — COOH or —COOR$^3$ or —OCOR$^3$ or —NH$_2$ or —NH— according to the compound(s) (II) used, in case where the ring forming reaction has been conducted in the absence of any cyclic anhydride (III), or maleimides N-substituted by groups functionalized by —COOH or —COOR$^3$ or —OCOR$^3$ with formation of the diacid corresponding to said cyclic anhydride (III), optionally in mixture with the excess of anhydride (III) or (I) not reacted, in case where the ring forming reaction has been conducted in the presence of cyclic anhydride (III); and
   in a third step, said product of the at least partially ring forming reaction is entered into a polycondensation and/or polyaddition reaction with at least one compound (III).

23. The process according to claim 22, wherein said first step is conducted at a temperature of 0 to 80° C., during 1 to 10 hours, in a polar solvent.

24. The process according to claim 22, wherein said second step is conducted in the presence of cyclic anhydride, at a temperature of 40 to 160° C., during 0.5 to 10 hours, optionally in an aprotic solvent and optionally in the presence of a ring forming catalyst.

25. The process according to claim 22, wherein said second step is conducted in the absence of anhydride, at a temperature of 40 to 160° C., during 0.5 to 10 hours, in a solvent of the amic acid obtained in the first step and optionally in the presence of a ring forming catalyst.

26. The process according to claim 22, wherein in the case of a polycondensation with at least one polyol or one epoxy, and optionally with at least one polyacid or one anhydride, said third step is conducted at a temperature of 150 to 250°

C., optionally in the presence of at least one esterification catalyst, and optionally in the presence of at least one radical polymerization inhibitor.

27. The process according to claim 22, wherein, in the case of a reaction with a polyisocyanate, and optionally with at least one polyacid and/or one polyol and/or one epoxy, optionally an anhydride being present if a polyol is also present, said third step conducted at a temperature of 20 to 200° C., optionally the addition reaction of the polyacid with the polyisocyanate to be carried out in the presence of a catalyst, optionally the reaction addition of the polyol with the polyisocyanate carried out in the presence of a catalyst.

28. The process according to claim 22, wherein, in a preliminary step,

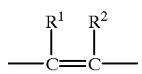

the double bond of anhydride (I) is protected by a reaction with a protecting agent selected from furan, furan derivatives, cyclopentadiene and cyclopentadiene derivatives, the deprotection being carried out during or after the second step under the action of heat.

29. The process according to claim 21, wherein:
in a first step, at least one maleic anhydride (I) is reacted with at least one compound (II) in a polar solvent medium, at a temperature of 20–150° C., said compounds (I) being introduced in a stoechiometric excess with respect to compound(s) (II), in order to form a partially ring forming product having N-substituted maleimides functionalized by —COOH or

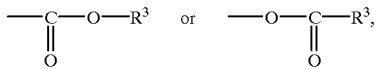

products of the opening of anhydride(s) (I), to anhydrid (I) optionally in mixture with the excess of anhydride (I); and
in a second step, said partially ring forming product is entered in a polycondensation and/or polyaddition reaction with at least one compound (III).

30. The process according to claim 21, wherein at least one compound (I), at least one compound (II) and at least one compound (III) selected from polyols, epoxy and polyamines, and optionally polyacids and cyclic anhydrides, are reacted in the absence of any solvent, in a stoechiometric excess of compound(s) (I) with respect to compound(s) (II), at a temperature of 180° C.–200° C. which is reached by steps or directly or gradually, with removing any condensation water, optionally bringing the mixture to a temperature lower than 160° C., adding at least one polyisocyanate (III) and conducting the alcohol/isocyanate reaction at said temperature.

31. The process according to claim 21, wherein at least one compound (I) and at least one compound (II) are reacted in a stoechiometric excess of compound(s) (I) with respect to compound(s) (II), in the absence of any solvent, at a temperature of 20–150° C., during 1 to 3 hours, then at least one compound (III) selected from polyols, epoxy and polyamines and optionally polyacids and cyclic anhydrides are added, and the reaction medium is brought to a temperature of 180° C.–200° C., which is reached by steps or directly or gradually, with removing any condensation water, optionally bringing the mixture to a temperature lower than 160° C., adding at least one polyisocyanate (III), and conducting the alcohol/isocyanate reaction at said temperature.

32. The process according to claim 21, wherein at least one compound (I), at least one compound (II) and, as compounds (III), at least one polyisocyanate and at least one polyacid, and optionally at least one compound selected among polyols, epoxy and polyamines are reacted, in the absence of any solvent, in a stoechiometric excess of compound(s) (I) with respect to compound(s) (II), at a temperature lower than 160° C.

33. The process according to claim 21, wherein the product which is obtained is modified by reacting it with a monoepoxy, at a temperature of the order of 110–150° C. in order to lower its acid value.

34. Polymerizable and/or crosslinkable compositions, comprising at least one prepolymer as defined in claim 1.

35. The polymerizable and/or crosslinkable compositions according to claim 34, wherein they are polymerizable and/or crosslinkable by free radical route, radicals being induced either by thermal route and/or by irradiation by ultraviolet light, visible light, or an electron beam.

36. Products obtained by polymerization and/or crosslinking of the compositions as defined in claim 34.

* * * * *

UNITED STATES PATENT AND TRADEMARK OFFICE
CERTIFICATE OF CORRECTION

PATENT NO. : 6,271,339 B1 Page 1 of 1
DATED : August 7, 2001
INVENTOR(S) : Philippe Thepot and Henri Strub It is certified that error appears in the above-identified patent and that said Letters Patent is hereby corrected as shown below:

<u>Title page,</u>
Item [73], is corrected to read as follows:
-- Assignee: Cray Valley, S.A., Puteaux, France --

Signed and Sealed this

Thirtieth Day of July, 2002

Attest:

Attesting Officer

JAMES E. ROGAN
*Director of the United States Patent and Trademark Office*